United States Patent [19]

Gort

[11] 4,286,394
[45] Sep. 1, 1981

[54] RECOVERY OF SOLVENT RESIDUES FROM TEXTILES

[75] Inventor: Meinrad Gort, Goldach, Switzerland

[73] Assignee: Rudolf Weber, Rorschach, Switzerland; a part interest

[21] Appl. No.: 109,157

[22] Filed: Jan. 2, 1980

[51] Int. Cl.$^3$ .............................................. F26B 13/02
[52] U.S. Cl. ......................................... 34/76; 34/160; 34/216; 34/242
[58] Field of Search .............. 68/5 D, 5 E, 6; 34/242, 34/76, 160, 212, 213, 216, 77

[56] References Cited

U.S. PATENT DOCUMENTS

| | | | |
|---|---|---|---|
| 3,213,470 | 10/1965 | Yasawa et al. | 68/5 D |
| 3,349,578 | 10/1967 | Greer et al. | 34/242 |
| 3,460,359 | 8/1969 | Schiffer | 34/242 |
| 3,991,481 | 11/1976 | Coraor et al. | 34/28 |
| 4,087,992 | 5/1978 | Sando et al. | 68/5 E |

Primary Examiner—Larry I. Schwartz
Attorney, Agent, or Firm—Weiser, Stapler & Spivak

[57] ABSTRACT

A steam lock is connected to the processing chamber in which textile goods are treated with an organic solvent which is immiscible with water. The web of material is led through this lock. This steam lock consists of an evacuation chamber which is separated from the processing chamber by a pair of sealing lips, of a plurality of steam chambers which are separated from each other and from the evacuation chamber by constrictions, and of a compensating chamber which is also separated by a constriction from the steam chambers. All the chambers are connected to a condenser and a water separator by means of a suction duct. The steam chambers are equipped with steam pipes which are adjustable and provided with slit nozzles, and superheated steam is supplied to these steam pipes.

10 Claims, 2 Drawing Figures

RECOVERY OF SOLVENT RESIDUES FROM TEXTILES

The present invention relates to a system for recovering the residues of solvents which remain in textile material during continuous processing of the textile in a processing chamber with a solvent which is organic and immiscible with water, or with a processing medium which contains same, followed by driving off of the solvent from the textile material being processed by means of a gas which is heated above the boiling temperature of the solvent and condensation of the gas containing the solvent.

The recovery of volatile, organic liquids which are immiscible with water, during the treatment of solid materials, such as textiles, is of the greatest economic and ecological importance. In U.S. Pat. No. 3,542,506, there is described the use of superheated steam in a counter-current process, in order to recover halogenized hydrocarbon solution for the dry cleaning of moving textile webs. The solvent vapors and the steam are condensed and the solvent is separated from the water in conventional manner, as in a water separator.

According to U.S. Pat. Nos. 3,408,748, and 3,466,757, it is known to bring the material wet with solvent into contact with a superheated washing-solvent vapor, in order to remove the solvent from the material. In so doing, the same solvent can be used for the solvent-washing material as is used for the wetting.

These known systems and methods can consume much energy, as well as wetting- and washing-solvent. For example, the use of super heated steam can be ineffective for the removal of a solvent having a high boiling point. Likewise, the use of superheated organic liquid in place of superheated steam can be ineffective and also very costly when the organic liquid is not recovered from the material being treated.

In order to enhance the efficiency through savings of solvent, it was proposed in U.S. Pat. No. 3,991,481 to supply the material after treatment in a processing chamber to a further container and there, to pass it through a superheated steam zone which was heated by means of superheated solvent vapor. Due to this superheating of the material, or rather of the solvent, there evaporates a substantial portion of the solvent which still clings to the material after processing and this can then be recovered.

In continuous textile processing machines, particularly in the treatment of twisted yarns and at elevated material transport speeds, the removal of the residual solvent according to the above-mentioned U.S. Pat. No. 3,991,481 is insufficient because excessive quantities of solvent continue to be carried along and these then contaminate the environment.

Accordingly, it is an object of the present invention to provide a system as initially described, by means of which there is removed from the processed material, and made available for reuse, several times as much solvent for practically the same energy consumption, and particularly for high material transport speeds, compared to that which is obtained by the known method.

In accordance with the invention, this is accomplished by a system which embodies the subject matter of the appended claims.

This invention will be described with reference to the drawings in which a preferred embodiment of the system is disclosed by way of illustration.

Figure 1:
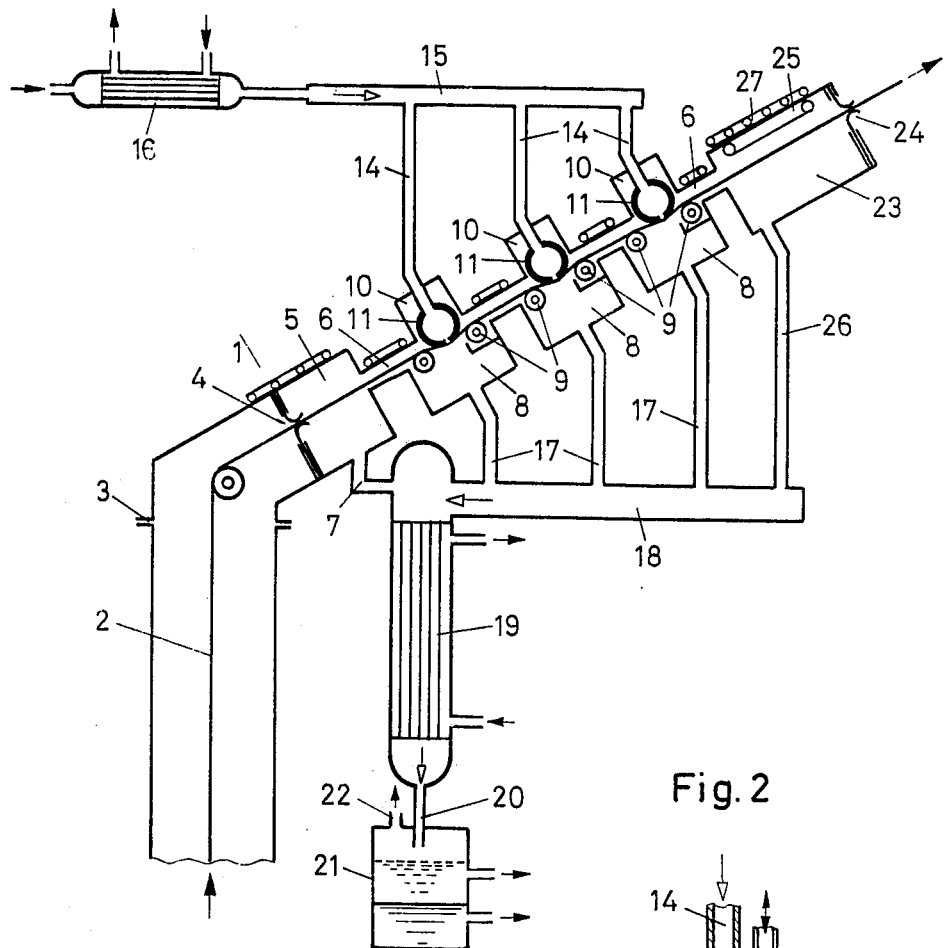
FIG. 1 shows a system embodying the invention in an elevation cross-section, with the path of the textile material also indicated.
Figure 2:
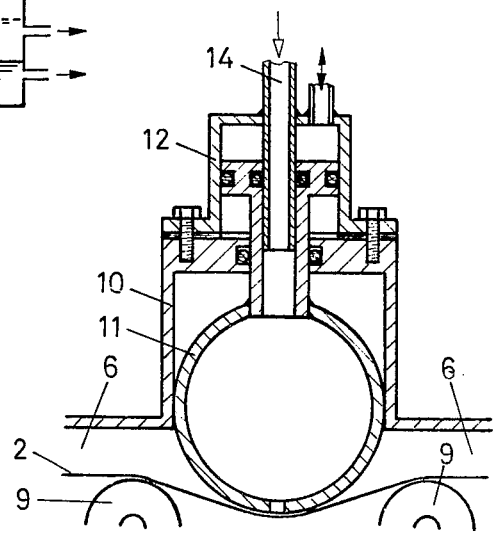
FIG. 2 shows an injection pipe provided with slit nozzles as shown in FIG. 1, but to a larger scale.

The steam lock 1 illustrated in FIG. 1 is attached by means of a flange 3 to the machine exit of a continuous solvent processing installation. The material inlet to the steam lock 1 is closed by means of a pair of sealing lips 4. Constriction 6 defines the evacuation chamber 5. On the bottom of chamber 5 there is attached an evacuation duct 7. The subsequent steam chambers 8 are subdivided at their inlet and outlet, respectively, as well as from each other by means of additional constrictions 6. Depending upon the machine production rate, one or more such chambers 8 are used. In each of these steam chambers 8, two steam heated pipes 9 are provided for the guidance of material web 2. In each chamber head 10, there is an injection pipe 11, provided with slit nozzles which can be moved up against the material web or which can be retracted from it by means of piston cylinder 12. This injection pipe 11 passes through the chamber head 10. Each of these injection pipes is provided with an inlet duct 14 which is connected through a steam pipe 15 with the superheater 16. In the bottom of each steam chamber, there is a suction duct 17, and these suction ducts are jointly led into a collecting manifold 18 which is connected to a condenser 19. From this condenser 19, an outlet pipe 20 leads to a water separator 21. The water separator 21 is provided with an evacuation pipe 22.

Following the last steam chamber 8, the constricted passage leads into the compensating chamber 23 which is closed by means of an adjustable pair of sealing lips 24. This compensating chamber is provided with an additional steam heated heating hose 25. A suction duct 26 is also connected to the collection manifold 18. The entire steam lock is further provided with a surface heater 27.

Compared with known arrangements of this type, the system embodying the invention differs in that the textile web 2, which leads out from the processing system (not shown) filled with solvent vapor, (e.g. $CCl_2F\text{-}CClF_2$), and arrives first in an evacuation chamber 5, separated from the processing system by a pair of sealing lips 4. From this evacuation chamber 5, the goods are transported into one or more chambers 8 via constrictions 6, which are a predetermined distance apart. In the head of these steam chambers 8, there are steam injection pipes 11, provided with slit nozzles and adjustable in height, through which superheated steam is propelled onto and through the textile web 2. This steam is propelled into the chamber portions located below the material web, together with the solvent removed from the material. From these chambers 8, the mixture of water and solvent is led into a condenser 19, where it is condensed and further led into a water separator 21 where the solvent is separated from the water utilizing its distinctive density. Following the steam chambers 8, there is positioned a compensating chamber 23, which is closed off from the steam chambers 8 by a further constriction 6, and which is closed off from the outside by a pair of sealing lips 24. The steam which reaches the compensating chamber 23 from the steam chambers 8 is also ducted into the condenser.

By virtue of this multiple chamber system, it becomes possible to reduce the solvent concentration in the steam lock in steps toward the exit of the material and thereby to recover it in the steam to a very great extent.

I claim:

1. A system for recovering the residues of solvents which remain in textile material during continuous processing of the textile in a processing chamber with a solvent which is organic and immiscible with water, or with a processing medium which contains same, followed by driving off of the solvent from the textile material being processed by means of a gas which is heated above the boiling temperature of the solvent and condensation of the gas containing the solvent, said system comprising a chamber arrangement connected in gas-tight manner to the processing chamber and including at least three chambers equipped with transport means for the textile and separated by locks from each other, at least one of said chambers which is neither the first nor the last chamber traversed by the textile is provided with nozzle means for propelling heated gas through the textile, and at least the first traversed chamber being provided with means for evacuating said first traversed chamber.

2. A system according to claim 1 wherein the chamber arrangement is closed off by means of sealing lips from the processing system chamber at the entrance to the first traversed chamber on the one hand, and at the outlet from the last traversed chamber, on the other hand.

3. The system of claim 1 wherein the nozzle means for injecting heated gas, comprises pipes having at least one slit extending in their lengthwise direction.

4. A system according to claim 1 further including means for evacuating all of said chambers.

5. A system according to claim 1 wherein said heated gas is steam.

6. A system according to claim 1 wherein said chamber arrangement includes at least two chambers provided with nozzle means and said heated gas is steam.

7. A system for recovering the residues of solvents which remain in textile material during continuous processing of the textile in a processing chamber with a solvent which is organic and immiscible with water, or with a processing medium which contains same, followed by driving off of the solvent from the textile material being processed by means of a gas which is heated above the boiling temperature of the solvent and condensation of the gas containing the solvent, said system comprising a chamber arrangement connected in gas-tight manner to the processing chamber and including at least three chambers equipped with transport means for the textile and separated by locks from each other, at least one of said chambers which is neither the first nor the last chamber traversed by the textile is provided with nozzle means comprised of pipes having at least one slit extending in their lengthwise direction for propelling heated gas through the textile, said nozzle means mounted for adjusting the spacing between said nozzle means and said textile material, and at least the first traversed chamber being provided with means for evacuating said first traversed chamber.

8. The system of claim 7 wherein pneumatically or hydraulically actuated height adjustment means for the pipes is provided for adjustment of the spacing.

9. A system for recovering the residues of solvents which remain in textile material during continuous processing of the textile in a processing chamber with a solvent which is organic and immiscible with water, or with a processing medium which contains same, followed by driving off of the solvent from the textile material being processed by means of a gas which is heated above the boiling temperature of the solvent and condensation of the gas containing the solvent, said system comprising a chamber arrangement connected in gas-tight manner to the processing chamber and including at least three chambers equipped with transport means for the textile and separated by locks from each other, at least one of said chambers which is neither the first nor the last chamber traversed by the textile is provided with nozzle means for propelling heated gas through the textile, at least the first traversed chamber being provided with means for evacuating said first traversed chamber, and a surface heater positioned on all of the chambers of the chamber arrangement.

10. The system of claim 9 wherein the last traversed chamber is provided with a supplemental heater.

* * * * *